3,072,569
DRILLING FLUID COMPOSITIONS
Frederick Herman Siegele, Westport, Conn., assignor to American Cyanamid Company, New York, N.Y., a corporation of Maine
No Drawing. Filed Aug. 15, 1960, Ser. No. 49,407
5 Claims. (Cl. 252—8.5)

This invention relates to a novel method for controlling the water-loss characteristics of aqueous clay or mud dispersions of the type employed in drilling oil, gas or other deep wells. More particularly, the invention is concerned with the inclusion of novel water-loss controlling reagents to clay base fluid drilling muds of high calcium content and to drilling muds containing the new reagent.

As is known, in the drilling of oil wells and other deep wells by rotary drilling processes, it is standard practice to recirculate an aqueous drilling mud fluid down through the hollow drill pipe, across the face of the drill bit, and upward through the drill hole. The drilling mud functions both as a coolant and lubricant for the drill bit. The mud also raises the drilling cuttings to the surface and seals the sides of the well to prevent loss of water and drilling fluids into the formation through which the drill hole is being bored. After each passage through the well, the drilling mud is passed through a settling tank wherein the sand and drill cuttings are separated. The fluid is then recirculated and pumped into the drill pipe and the process repeated until the fluid becomes unwieldly viscous.

The problem of controlling the viscosity and thixotropic characteristics of aqueous mud dispersions has been satisfactorily resolved in prior practice by the use of bentonite clays, which impart thixotropic characteristics to the mud, and by the judicious use of organic and inorganic dispersions or thinners. However, the problem for the control of water in high calcuim content muds, when operating at elevated temperatures above about 300° F., remains a vexing and serious one, which has not been wholly resolved.

To alleviate the aforementioned difficulties, two major classes of water-loss additives are presently in use. These are:

(1) Cellulosic products derived from organo colloids such as, for instance, starch and sodium carboxymethylcellulose, and
(2) Synthetic polymers derived from hydrolyzed polyacrylonitrile as, for instance, the alkali metal salts of polyacrylates.

Unfortunately, such additives are not wholly satisfactory for the reason that they either suffer thermal degradation at temperatures above 300° F. in the event that a cellulosic additive product is employed, or they are not operative in a high calcium content drilling mud as is the case of the polyacrylates. Since most drilling muds usually contain soluble calcium, due to either the addition of calcium salt thereto or due to calcium salt contamination from gypsum formations, the employment of a water-loss additive, which would overcome these drawbacks, would be highly desirable.

It is, therefore, a principal object of the present invention to provide a novel class of reagents adapted to be incorporated in drilling muds and which will provide a high degree of water-loss control at elevated temperatures in the presence of high concentrations of soluble calcium. Other objects and advantages will become readily apparent to those skilled in the art from a consideration of the ensuing description.

In accordance with the practice of the instant invention, a small amount of a substantially homogeneous linear hydrocarbon chain polymer of relatively high molecular weight, as determined by its specific viscosity, containing predominantly hydrophilic hydroxyl groups and a lesser number of carboxylic acid groups, is added to the clay base fluid drilling mud of high calcium content. By a "drilling mud of high calcium content" is meant a mud containing calcium ion to the extent of at least 500 parts per million. However, it is a prime requirement for purposes of successful operation that the ratio of the hydroxyl groups to carboxylic acid groups be maintained at predetermined limits as hereinafter described.

A preferred embodiment of the instant invention is the employment of hydrolyzed polymers derived from vinyl acetate and a lower alkyl acrylate such as, for instance, ethylacrylate, methylacrylate, propylacrylate and equivalents thereof, wherein the molar ratio of polyvinyl alcohol to alkali metal polyacrylate formed during said polymerization and subsequent alkaline hydrolysis resulting in hydroxyl and carboxylic acid groups is in the range of from 70–90 to 30–10, respectively. However, for optimum performance, it has been found that a molar ratio of hydroxyl to carboxyl groups should be maintained in the polymer additive within the range of from 72–78 to 28–22, respectively.

Advantageously, the substantial homogeneous polymers, hereinabove described, may be prepared by conventional methods. A preferred method resides in the substantially instantaneous copolymerization of vinyl acetate and a requisite amount of either a carboxylic acid monomer as, for example, acrylic or methacrylic acid or a carboxylic acid derivative which on hydrolysis yields a carboxylic acid salt. Illustrative carboxylic acid derivatives, which are contemplated herein, are, for example, acrylonitrile, acrylamide, acrylate alkyl esters and methacrylate alkyl esters.

Substantial improvement in water-loss characteristics of high calcium content drilling muds utilized at temperatures in excess of 300° F. is noted when the aforementioned molar ratio of hydroxyl to carboxylic acid groups is found in the polymer molecule. Also contemplated within the purview of the instant invention are terpolymers containing up to about 5% of a monomer yielding sulfonic acid or sulfonate groups, for instance, vinyl sulfonic acid or its esters and salts may be incorporated with vinyl acetate and acrylic acid, and thereafter polymerizing the latter to obtain a polymer containing not more than 30 parts of carboxylic acid groups.

In general, it has been found in accordance with the process of the present invention that the polymers herein incorporated in drilling mud should have a substantial molecular weight as indicated by their specific viscosity measurements ($N_{sp}$) as determined by preparing 0.5% hydrolyzed polymer solutions in 1N aqueous sodium chloride at 30° C. Specific viscosity values above 0.4 are required to obtain satisfactory fluid loss control preparations when incorporated in the drilling mud. However, for most purposes, a polymer having a specific viscosity measurement of at least 0.8 is satisfactory. For optimum performance, a polymer having a specific viscosity value of 1.2 or greater is utilized. In general, however, polymers of high molecular weight having specific viscosity values of from 0.4 to 2.0, and preferably from 0.8 to 1.6, are contemplated.

It is an advantage of the invention that any of the drilling muds now in use may be treated with the copolymers as hereinabove defined. The muds may be made up with bentonite clays, such as the known Rogers Lake mud from California, either with a high yield, high density clay used in deep hole drilling, or with a low yield clay, such as is obtained from the drilling formation itself as typified by that obtained from the Ventura field in California. Further, muds containing Attapulgus clay, which are frequently used in drilling through salt-containing formations, as well as emulsion-type muds wherein a hydrocarbon, such as crude oil, is emulsified in an aqueous clay suspension usually in quantities of from about 10 percent to 40 percent based on the weight of the mud, are also contemplated.

The quantity of copolymers added to the above drilling mud fluid may be varied over a wide range. Usually from about 0.1 to about 4 to 5 pounds of polymer per barrel (i.e., 350 pounds) of drilling mud is operative for the intended purpose of utilizing such mud compositions at temperatures above 300° F., although larger quantities of polymers, even as high as 8 pounds per barrel, may be employed. For most purposes, however, quantities in the range of about 0.2 to 2 pounds of polymer per barrel can be satisfactorily used.

The invention will be illustrated further by the following specific examples. It will be noted, however, that examples, while describing in some details the advantage of the invention, are given primarily for purposes of illustration and are not deemed to be limitative of the invention.

The water-loss tests described in the hereinafter presented examples are conducted in a standard low-pressure filter press, which consists of a three inch closed pressure filter connected to a compressed nitrogen tank and provided with a graduate for measuring the volume of filtrate. The water-loss values are obtained utilizing 100 pound pressure on the filter and an average filtration temperature of 25° C., except where noted otherwise. At elevated temperatures, a Baroid high pressure-high temperature filter press is employed in determining fluid loss values. With such equipment, fluid loss values are obtained at any operation temperature up to 350° F. under a differential pressure of 100 pounds per square inch. Before fluid loss results are obtained, the mud is heated for an additional one half hour after the desired jacket temperature has been reached in order to insure equilibrium and mud temperatures.

All parts are by weight, unless otherwise noted.

EXAMPLE 1

A mixture of 85 parts of vinyl acetate and 15 parts of acrylonitrile is emulsified and stirred in a suitable dropping funnel in 160 parts of water containing 2 parts of dihexyl sodium sulfoscuccinate and 0.55 part of sodium bisulfite. Resultant deoxygenated emulsion is added to a reactor containing a deoxygenated solution of 2 parts of dihexyl sodium sulfosuccinate and 1.15 parts of ammonium persulfate in 50 parts of water maintained at a temperature of 60° C. The emulsion is added dropwise to the reactor so as to effect rapid polymerization of the monomers whereby a substantially homogeneous copolymer is obtained. The dropwise addition takes place over a period of about two hours. The contents remain in the reactor for an additional seven hours. Then the emulsion containing substantially homogeneous copolymer is broken by the addition of a saturated solution of sodium chloride. Resultant polymer is washed with water and dissolved in acetone. The latter solution is added to an aqueous mixture containing the molecular equivalent of sodium hydroxide necessary to hydrolyze the ester and nitrile groups, respectively, to obtain the corresponding alcohol and carboxylic acid derivative. The latter is next heated at 90° C. and acetone is distilled off. After standing for 24 hours, a water-soluble polymer is recovered as a substantially homogeneous copolymer of sodium polyacrylate and polyvinyl alcohol having a specific viscosity value equal to 1.07. The molar ratio of polyvinyl alcohol (i.e., hydroxyl groups) to sodium polyacrylate (carboxylic acid groups) in the polymer molecule is 75 to 25, respectively.

EXAMPLE 2

In a suitable reaction vessel 73.5 parts of vinyl acetate and 26.5 parts of ethyl acrylate are emulsified in 160 parts of water containing 5 parts of sodium lauryl sulfate and 0.33 part of sodium bisulfite. The resultant deoxygenated emulsion is placed in a dropping funnel and is added gradually over a period of about 40 minutes to a polymerization reactor containing a deoxygenated solution of 5 parts of sodium lauryl sulfate and 50 parts of water. Resultant solution is held at 65° C. Simultaneously 50 parts of deoxygenated water solution containing 0.69 part of ammonium persulfate is added from a second dropping funnel. The temperature is maintained for two hours and thereafter increased to 90° C., at which temperature the polymer emulsion is hydrolyzed in an aqueous solution containing 10 parts of sodium acetate and the molecular equivalent of sodium hydroxide necessary to hydrolyze the vinyl acetate and ethyl acrylate ester groups, respectively, to polyvinyl alcohol and sodium polyacrylate. After some 18 hours, a water-soluble polymer is recovered in which the molar ratio of hydroxyl to carboxylic groups present therein is 76 to 24, respectively. The polymer possesses a specific viscosity value equal to 1.59.

EXAMPLE 3

A copolymer containing 70 parts of vinyl acetate and 30 parts of butyl acrylate is prepared and hydrolyzed employing the conditions set forth in Example 2 above. The molar ratio of polyvinyl alcohol to polyacrylate is 78 to 22 and possesses a specific viscosity value equal to 0.89.

EXAMPLE 4

A mixture of 82.5 parts of vinyl acetate and 17.5 parts of ethyl acrylate is emulsified in a nitrogen atmosphere in 160 parts of water containing 2.8 parts of sodium lauryl sulfate and 0.15 part of sodium bisulfite. The emulsion is placed in a dropping funnel and added gradually over a period of 20 minutes to a polymerization reactor containing a deoxygenated solution of 2.8 parts of sodium lauryl sulfate and 25 parts of water maintained at a temperature of 70° C. At the same time, 25 parts of a water solution containing 0.25 part of ammonium persulfate are added from a second dropping funnel. Heating is continued at 70° C. for a period of two hours. Resultant polymer emulsion is hydrolyzed employing the hydrolyzing conditions set forth in Example 2 above. The molar ratio of polyvinyl alcohol to polyacrylate in the thus recovered polymer is 85 to 15 and possesses a specific viscosity value equal to 0.72.

EXAMPLE 5

The procedure of Example 2 is repeated in every detail except that 72 parts of vinyl acetate are reacted with 28 parts of ethyl acrylate. Resultant copolymer possesses a specific viscosity value equal to 1.68 and has a hydroxyl to carboxyl molar ratio of 75 to 25, respectively.

EXAMPLE 6

In a suitable reaction vessel, 75 parts of vinyl acetate, 25 parts of ethyl acrylate and 2 parts of sodium vinyl sulfonate are emulsified in 150 parts of water containing 5 parts of sodium lauryl sulfate and 0.08 part of sodium bisulfite. Resultant deoxygenated emulsion, which is contained in a dropping funnel, is added dropwise over a one hour period to a polymerization reactor containing two parts of sodium lauryl sulfate and 25 parts of water maintained at a temperature of 70° C. Polymerization is conducted at the latter temperature for a total of four hours. A stable polymer emulsion of fine particle size is obtained.

The polymer emulsion is added to an aqueous solution containing the molecular equivalent of sodium hydroxide necessary to hydrolyze the ester groups to the alcohol and sodium carboxylate. At no time during the aforementioned hydrolysis did the emulsion break. Resultant hydrolyzed terpolymer possesses a specific viscosity equal to 1.06 and a hydroxyl to carboxylic acid molar ratio of 78 to 22, respectively.

While the alyaline hydrolysis of each polymer in the above examples is limited to the use of sodium hydroxide, alkali metal hydroxides, carbonates and the like may also be employed as, for instance, potassium hydroxide, lithium hydroxide, potassium carbonate, sodium carbonatae and equivalents thereof.

Polymers prepared in accordance with Examples 1–6 above are each added to a drilling mud of the hereinbelow defined compositions whereby the efficiency of each of the polymers is ascertained. The polymers of the examples will be compared with commercially available additives.

EXAMPLE 7

A typical drilling mud having a density of 10 pounds per gallon is prepared using the following ingredients:

| | Pounds per barrel |
|---|---|
| Sodium bentonite | 15.0 |
| Calcium bentonite (X-act clay) | 31.0 |
| Barium sulfate | 73.0 |
| Ferric chromate-lignosulfonate | 3.5 |
| Calcium sulfate | 5.0 |

Sufficient sodium hydroxide is added to adjust the drilling mud fluid to a pH=10.0. A 30 minute fluid loss test, as described above, on the base mud yields a loss of 24.5 cc. Titration of the filtrate with ethylenediamine tetrasodium acetate using a dye indicator (Eriochrome) gives a value of 1200 parts per million of soluble calcium ion.

When 1.0 pound of the copolymer of Example 1 above per barrel of mud (350 pounds) is added to the aforedefined mud, the 30 minute fluid loss is substantially reduced to 9.0 cc. When a total of 2.0 pounds of the copolymer of Example 1 is added to a barrel of mud (350 pounds), the 30 minute water-loss is found to be 5.5 cc.

The polymer of Example 1 which is added to the above mud is tested for thermal stability. Muds containing two pounds per barrel of said fluid loss additive are heated in a sealed bomb for 24 hours at 370° F. In a fluid loss test conducted at room temperature for 30 minutes, it has been found that 11.9 cc. of fluid are lost, whereas in the absence of any additive as much as 35.2 cc. are lost. Where sodium carboxymethylcellulose is employed in a mud subjected to 370° F., a 30 minute water-loss is found to be 32.8 cc.

In the event either a homopolymer, such as sodium polyacrylate per se, or a copolymer containing predominantly polyacrylates (i.e., carboxylic acid groups) and small amounts of hydroxyl groups are present, high temperature fluid loss values are determined employing a Baroid high-temperature, high-pressure filter press method as mentioned hereinabove. Comparing the latter polymer with sodium carboxymethylcellulose and the copolymer of Example 1, the following results are set forth in Table 1 below.

*Table 1*

| Additive | Concentration lbs./bbl.[1] | Temperature, °F. | Fluid loss in cc. after 30 minutes |
|---|---|---|---|
| Control | | 100 | 21.5 |
| Do | | 300 | 50.0 |
| Sodium carboxymethylcellulose | 1.0 | 100 | 5.6 |
| | 1.0 | 300 | 14.3 |
| Sodium polyacrylate | 1.0 | 100 | 5.3 |
| | 1.0 | 300 | 48.5 |
| Polyacrylate/polyvinyl acetate [2] | 1.0 | 100 | 5.4 |
| | 1.0 | 300 | 49.0 |
| Polyvinyl alcohol/sodium polyacrylate copolymer of Example 1 | 1.0 | 100 | 5.5 |
| | 1.0 | 300 | 13.0 |

[1] Bbl.=350 pounds.
[2] Containing a molar ratio of carboxylic acid to hydroxyl groups equal to 95 to 5, respectively.

It will be apparent that, while fluid loss reagents such as sodium polyacrylate possess good thermal stability, their efficiency decreases substantially at high temperatures in muds which contain soluble calcium. On the other hand, the efficiency of the polymer prepared in accordance with Example 1 above as being entirely satisfactory under conditions involving high temperatures and calcium contamination, is demonstrated.

EXAMPLE 8

The fluid loss control and thermal stability tests are conducted in the mud described in Example 7 above. The tests are performed using polymers containing predominantly polyvinyl alcohol and lesser amounts of sodium polyacrylate in the same aforementioned mud together with three commercially available fluid loss control materials. The fluid loss control data on tests conducted at room temperature is tabulated below as follows:

*Table 2*

| Additive | Concentration lbs./bbl.[1] | Fluid loss after 30 minutes in cc. after heating at 370° F. for— | | |
|---|---|---|---|---|
| | | 8 hours | 24 hours | 48 hours |
| Control | | 21.6 | 20.6 | 20.0 |
| Sodium carboxymethyl cellulose | 1.0 | 17.7 | 19.9 | |
| Drilling mud starch | 4.0 | 19.5 | | |
| Sodium polyacrylate | 1.0 | | 10.6 | 9.8 |
| Polyvinyl alcohol/polyacrylate copolymer of Example 2 | 1.5 | | 10.3 | 8.5 |

[1] 350 pounds.

From the foregoing table, it will be noted that the absence of any increase in fluid loss of values between 24 and 48 hour period due to the presence of the copolymer of Example 2 above illustrates the appreciable thermal stability of the resultant mud composition. Cellulosic materials, such as drilling mud starch as well as sodium carboxymethylcellulose have lost all fluid-loss activity after 8 hours.

High temperature fluid loss data are obtained and summarized in the table below when employing the polymers of Examples 3, 4 and 5 above. The procedure for determining the fluid loss data is set forth in Example 7 above.

*Table 3*

| Additive | Concentration lbs./bbl.[1] | Temperature, °F. | Fluid loss in cc. after 30 minutes |
|---|---|---|---|
| Control | | 100 | 14.0 |
| Control | | 330 | 36.5 |
| CMC [2] | 1.0 | 100 | 4.3 |
| | 1.0 | 330 | 12.8 |
| Drilling mud starch | 4.0 | 100 | 5.5 |
| | 4.0 | 330 | 17.8 |
| Sodium polyacrylate | 1.0 | 100 | 4.5 |
| | 1.0 | 330 | 35.0 |
| Polyvinyl alcohol/sodium polybutylacrylate copolymer of Example 3 | 1.5 | 100 | 5.9 |
| | 1.5 | 330 | 11.5 |
| Polyvinyl alcohol/sodium polyacrylate copolymer of Example 4 | 1.5 | 100 | 7.5 |
| | 1.5 | 330 | 15.2 |
| Polyvinyl alcohol/sodium polyacrylate copolymer of Example 5 | 1.5 | 100 | 6.6 |
| | 1.5 | 330 | 13.4 |
| Polyvinyl alcohol/sodium polyacrylate sodium polyvinyl sulfonate copolymer of Example 6 | 1.5 | 100 | 6.5 |
| | 1.5 | 330 | 12.0 |

[1] Bbl.=350 pounds.
[2] CMC=Sodium carboxymethylcellulose.

EXAMPLE 9

Water loss test is conducted on a lime base drilling fluid of pH=12.3 containing the following formulation:

| | Pounds per barrel |
|---|---|
| Sodium bentonite | 12.0 |
| Calcium bentonite (X-act clay) | 25.0 |
| Barium sulfate | 60.0 |
| Quebracho | 2.0 |
| Sodium hydroxide | 3.0 |
| Lime | 4.0 |

The density of the aforementioned mud composition is 9.7 pounds per gallon.

Water loss test is further carried out on a mud clay containing 20 pounds per barrel of Attapulgite clay in saturated sodium chloride solution. The alkalinity of the solution is adjusted to pH=9 with sodium hydroxide.

In the following table, results of water loss tests are tabulated demonstrating the effect of a polymer additive contemplated by the present invention as compared to effects of other known additives, all used in the aforementioned clays. Clearly, superior fluid loss properties are manifest when employing the copolymer hereinafter described.

Table 4

| Additive | Concentration, lbs./bbl. | 30 Minute fluid loss in cc. | |
|---|---|---|---|
| | | Saturated salt water-Attapulgite mud | Lime mud |
| Control | | 180.0 | 17.8 |
| Sodium carboxymethyl cellulose | 1.5 | 23.7 | 7.0 |
| Sodium Polyacrylate ($N_{sp}$=1.5) | 1.5 | 45.7 | |
| Polyvinyl alcohol/sodium polyacrylate copolymer [1] | 1.5 | 15.7 | 7.1 |

[1] Containing a molar ratio of 75 parts of hydroxyl groups to 25 parts of carboxylic acid groups and having a specific viscosity equal to 1.68.

It is an advantage of the present invention that copolymers possessing a high molar ratio of hydroxyl to carboxylic acid groups unexpectedly produce a highly desirable effect when added to drilling muds of high calcium content. It is possible now to employ drilling mud additives of high calcium content while operating at temperatures above 300° F., simultaneously obtaining an effect heretofore unavailable. There appears to be little decomposition, resulting in a drilling mud which can be reused to a heretofore unrealizable extent.

EXAMPLE 10

In this example, room temperature water loss tests are conducted in a gypsum mud drilling fluid described in Example 7. The results are tabulated as follows:

Table 5

| Additive | Concentration, lbs./bbl.[1] | Fluid loss in cc. after 30 minutes |
|---|---|---|
| Control | | 13.2 |
| Hydrolyzed polyvinyl alcohol/sodium polyacrylate/sodium polyvinyl sulfona terpolymer. | 0.5 | 10.4 |
| | 1.0 | 7.5 |
| | 1.5 | 5.4 |

[1] Bbl.=350 pounds.

I claim:
1. A drilling fluid comprising a major amount of an aqueous clay dispersion of a high calcium content containing at least 500 parts per million in the form of calcium ions and, as fluid loss control agent, a minor amount of a substantially homogeneous linear hydrocarbon chain polymer having a specific viscosity value of from about 0.4 to 2.0 and containing hydroxyl and carboxylic acid groups in a molar ratio of from about 70–90 to 30–10, respectively, whereby waterloss due to the use of elevated temperatures above 300° F. and a high calcium content mud is markedly reduced.

2. A drilling fluid according to claim 1, wherein the fluid loss control agent is a high molecular weight hydrocarbon chain polymer having a specific viscosity in the range of from 0.8 to 1.5 and containing hydroxyl and carboxylic acid groups in a molar range of from 72–78 to 28–22, respectively.

3. A drilling fluid according to claim 1, wherein the fluid loss control agent is a hydrolyzed copolymer derived from vinyl acetate and acrylonitrile having a specific viscosity value equal to 1.07 and containing a molar ratio of hydroxyl to carboxylic acid groups equal to 75 to 25, respectively.

4. A drilling fluid according to claim 1, wherein the fluid loss control agent is a hydrolyzed copolymer derived from vinyl acetate and butylacrylate having a molar ratio of hydroxyl to carboxylic acid groups equal to 78 to 22, respectively, and having a specific viscosity value equal to 0.89.

5. A drilling fluid according to claim 1, wherein the fluid loss control agent is a hydrolyzed copolymer derived from vinyl acetate and ethyl acrylate having a molar ratio of hydroxyl to carboxylic acid groups equal to 75 to 25, respectively, and having a specific viscosity value equal to 1.68.

References Cited in the file of this patent

UNITED STATES PATENTS

| 2,718,497 | Oldham et al. | Sept. 20, 1955 |
| 2,802,783 | Weiss et al. | Aug. 13, 1957 |
| 2,935,504 | King et al. | May 3, 1960 |

FOREIGN PATENTS

| 803,544 | Great Britain | Oct. 29, 1958 |